INVENTOR
William D. Houghton
BY
Charles H. Brown
ATTORNEY

INVENTOR
William D. Houghton
BY
Charles H. Brown
ATTORNEY

Nov. 29, 1955 W. D. HOUGHTON 2,725,470

TIME DIVISION MULTIPLEX GATING ARRANGEMENTS

Filed Feb. 28, 1951 6 Sheets-Sheet 3

INVENTOR
William D. Houghton
BY
Charles H. Brown
ATTORNEY

INVENTOR
William D. Houghton
BY
Charles H. Brown
ATTORNEY

Nov. 29, 1955 W. D. HOUGHTON 2,725,470

TIME DIVISION MULTIPLEX GATING ARRANGEMENTS

Filed Feb. 28, 1951

6 Sheets-Sheet 5

INVENTOR
William D. Houghton
BY
Charles H. Brown
ATTORNEY

INVENTOR
William D. Houghton
BY
Charles H. Brown
ATTORNEY

United States Patent Office 2,725,470

Patented Nov. 29, 1955

2,725,470

TIME DIVISION MULTIPLEX GATING ARRANGEMENTS

William D. Houghton, Princeton, N. J., assignor to Radio Corporation of America, a corporation of Delaware Application February 28, 1951, Serial No. 213,233

6 Claims. (Cl. 250—27)

This invention relates to methods of and means for gating signals in time division multiplex signalling systems.

In time division multiplex systems, a number of message waves or modulating signals are sequentially sampled for short periods of time by different transmitting channel units. The samples from the different channels are in the form of pulses modulated in accordance with the different message waves. These are combined in a common output circuit to form a composite signal or a pulse train. The pulse train may be coupled to the receiving equipment either by direct wire connection or by a radio network.

In the receiving multiplex equipment, the received signal is applied to an input circuit common to a number of normally inoperative receiving channel units. The different receiving channel units are made operative at different time intervals in a manner such that each channel unit selects a different pulse sample from the applied wave during each cycle of operations. The channel units reproduce the original modulating signals on suitable output connections.

The combined pulse signal, consisting of a modulated pulse from each of the different channels in sequence, followed by one or more synchronizing pulses, will be referred to as a frame or cycle of operations. A number of such frames will be referred to as a pulse train signal.

In order to obtain maximum use of the available frequency bands and for optimum reproduction it is necessary to produce accurately timed gating (switching) pulses to effectuate the aforementioned sampling. It is also necessary to introduce some means for overcoming the distortion inherently introduced by the gating process caused by the gating tube passing through a non-linear portion of its characteristic as it changes from its conducting to its non-conducting state, and vice versa.

An object of the present invention is to provide improved means of sampling the pulse train signal prior to its application to the individual channel units.

Another object of the invention is to provide a time division multiplex system wherein the burden of producing accurately timed sampling or gate pulses is removed from the individual channel units and is placed on a common gating circuit which samples all channels with equal duration and identically shaped gating pulses.

Another object of the invention is to provide a time division multiplex system in which the required transmission frequency band can be reduced to values lower than previously practical by utilizing a novel method of sampling the received channel pulses and then selecting the samples by individual channel units.

In accordance with the present invention, the above and other objects are achieved by sampling the incoming pulse train signals at the receiving end of the system by means of gating pulses which are short compared to the time interval between pulses and which are equally spaced and identically shaped, prior to the application of the pulse train signals to the channel units. The resulting pulse signal is a series of amplitude modulated pulses with no signal occupying the time interval between adjacent pulses. Each receiving channel unit is then operated to open its gate during the no-signal time interval immediately preceding the pulse to be selected and then closes the gate during the no-signal time interval immediately following the selected pulse. A similar procedure of double-gating is followed at the transmitting end of the system.

A more detailed description of the invention follows in conjunction with the accompanying drawings, wherein:

Figs. 1*a* through 1*i* are a series of curves illustrative of the invention;

Fig. 2 is a schematic diagram of a circuit embodying the invention;

Figs. 3*a* through 3*e* are a series of curves illustrative of the operation of the arrangement shown in Fig. 2;

Fig. 4 is a representation in block diagram of a transmitter embodying the principles of the invention;

Figs. 5*a* through 5*l* are a series of curves illustrating the operation of the arrangement shown in Fig. 4;

Figures 1A, 1B, 1C, 1D, 1E, 1F, 1G, 1H, 1I, 3A, 3B, 3C, 3D, 3E:
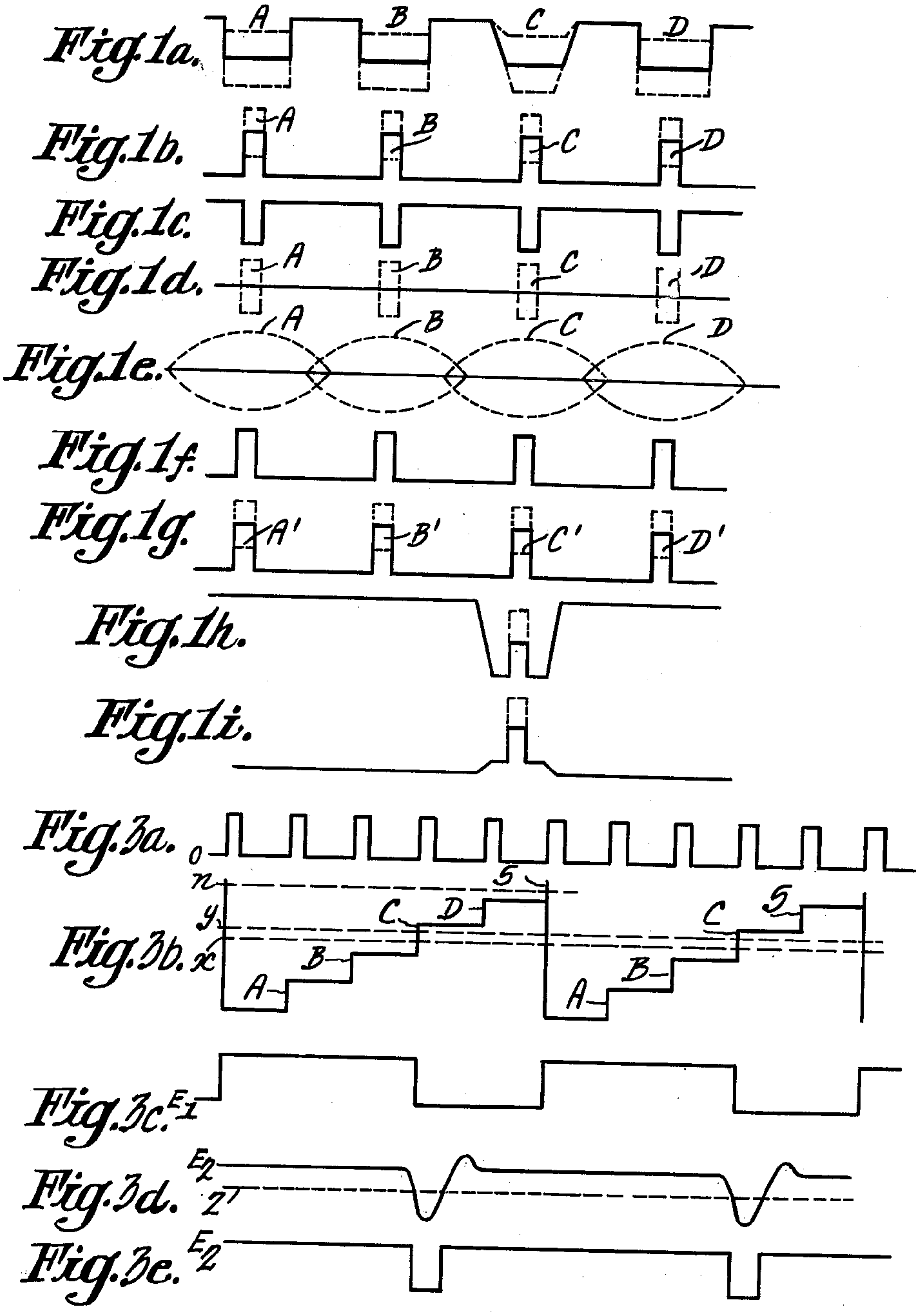

The basic principle of operation of the invention may be best understood by reference to Figs. 1*a* through 1*i*. Referring to Fig. 1*a* there is shown a single frame of a pulse train signal. For purposes of simplicity of description only four channels, A, B, C and D, have been shown. It is to be understood that the invention is equally adaptable to any other suitable number of channels. It will be understood that the four pulses shown have been derived by sampling four different message waves in time sequence and combining the separate pulses thus obtained into a common path. Here and throughout the drawings, the broken lines indicate the extremes of amplitude possible in the pulses due to the modulation components of the message wave. The solid line represents the unmodulated pulses. The pulse in channel C has been greatly distorted to indicate that the separate pulses from the channel units do not necessarily have exactly identical wave shape.

In accordance with the invention, the pulses of each frame are again sampled with relatively short pulses. The shorter sampling pulses are timed so as to fall within the center portion of the frame pulses. As a result of this second sampling a frame such as illustrated in Fig. 1*b* results. It will be seen that the pulses in the second frame are short in time duration relative to the pulses in the first frame but vary in amplitude in the same manner and in accordance with the variations in amplitude of the first frame pulses. However, since the frame of pulses in Fig. 1*b* was produced by a single sampler, all of the pulses will have identical characteristics. Since the sampling is normally accomplished by a vacuum tube, the pulses of Fig. 1*b* have been shown as having an opposite polarity to the pulses of Fig. 1*a*. It will be noted that due to the use of a common sampling circuit, the irregularities in configuration existing between the pulses A—D of Fig. 1*a* have been removed.

It is common practice to transmit the pulse train signal in the form of pulses which vary in amplitude plus and minus about a zero level. For purposes of simplicity this form of transmission is abbreviated as ±P. A. M. One simple manner of accomplishing this result is illustrated in Figs. 1*c* and 1*d*. A series of pulses which are unmodulated and which are of equal and opposite polarity to the solid line portion of the pulses of Fig. 1*b* are provided as shown in Fig. 1*c*. The pulses of Fig. 1*b* are combined in exact synchronism with the pulses of Fig. 1*c*. As a result, the solid line portion or direct current component of the pulses of Fig. 1*b* is cancelled leaving only the pulses indicated in Fig. 1*d* which vary plus and minus about zero in accordance with the modulation of the message wave.

In order to limit the required bandwidth, the pulses of Fig. 1*d* are passed through a low pass filter where the higher frequency components are removed prior to transmission. As a result of the removal of the higher frequency components the pulses are considerably widened and appear as shown in Fig. 1*e*. It will be noted that the pulses are shown as being widened to the extent that portions of the energy in one pulse extend over into the time interval occupied by adjacent pulses.

At the receiver, it is common practice to again pass the pulse train signal through a low pass filter which removes noise components having a frequency above that which the filter will pass, increasing the possibility of overlap between adjacent pulses. The pulse signal train is supplied to a bank of receiving channel units which are keyed on and off in sequence and in synchronism with the sampling of the message waves at the transmitting end of the system. Due to the overlapping portion of the pulses a certain amount of crosstalk is introduced into the reproduced message waves. In order to overcome this objection, the pulse train signal, prior to being fed to the receiving channel units is passed through a sampler gated on by pulses as indicated in Fig. 1*f*. The output of the receiving sampler appears as a series of amplitude modulated pulses of short time duration relative to the time between pulses as shown in Fig. 1*g*, which are then passed to the receiving channel units. Since the receiving sampler samples only the non-overlapping center portion of the pulses of the pulse train signal crosstalk is eliminated. Furthermore, since the pulses are all sampled in a common circuit, any distortion introduced by the sampling is uniform in all pulses and may easily be compensated for and any residual crosstalk may be balanced out by relatively simple crosstalk balancing circuits.

In the operation of the receiving channel units a vacuum tube is used as a gate which is energized to pass the signals in synchronism with the appearance of pulses of the corresponding channel in the pulse train signal. In accomplishing this gating, the gating tube changes from a non-conducting state to a state of linear amplification. From a consideration of the characteristic curve of an amplifier, it will be clear that in going from one state to another, the amplifier passes through a period of non-linear amplification. In accordance with the invention, distortion due to this factor is prevented by causing the receiving channel unit gate to open during the no-signal time interval just preceding the desired pulse and to close during the no-signal time interval just after the desired pulse. Thus, at the occurrence of the selected pulse, the gate is in its linear amplifying condition and the selected pulse will be passed without distortion. An additional advantage is gained by this method of operation in that exact timing of the gating pulses is not necessary since all that is required is that the gate be opened and closed during no-signal time intervals. A further advantage results in that steep sided gating pulses are not required since all that is necessary is that the gating amplifier be in its linear operating condition during the occurrence of the selected pulse. In Fig. 1*h* there is shown the gating pulse applied to one channel unit, namely channel C. For simplicity, there is shown superimposed upon the pulse the selected channel pulse. Similar gating pulses, timed to select pulses from the other channels would be applied to the other channel units. The resulting output of the channel C unit is shown in Fig. 1*i*.

Figure 2:
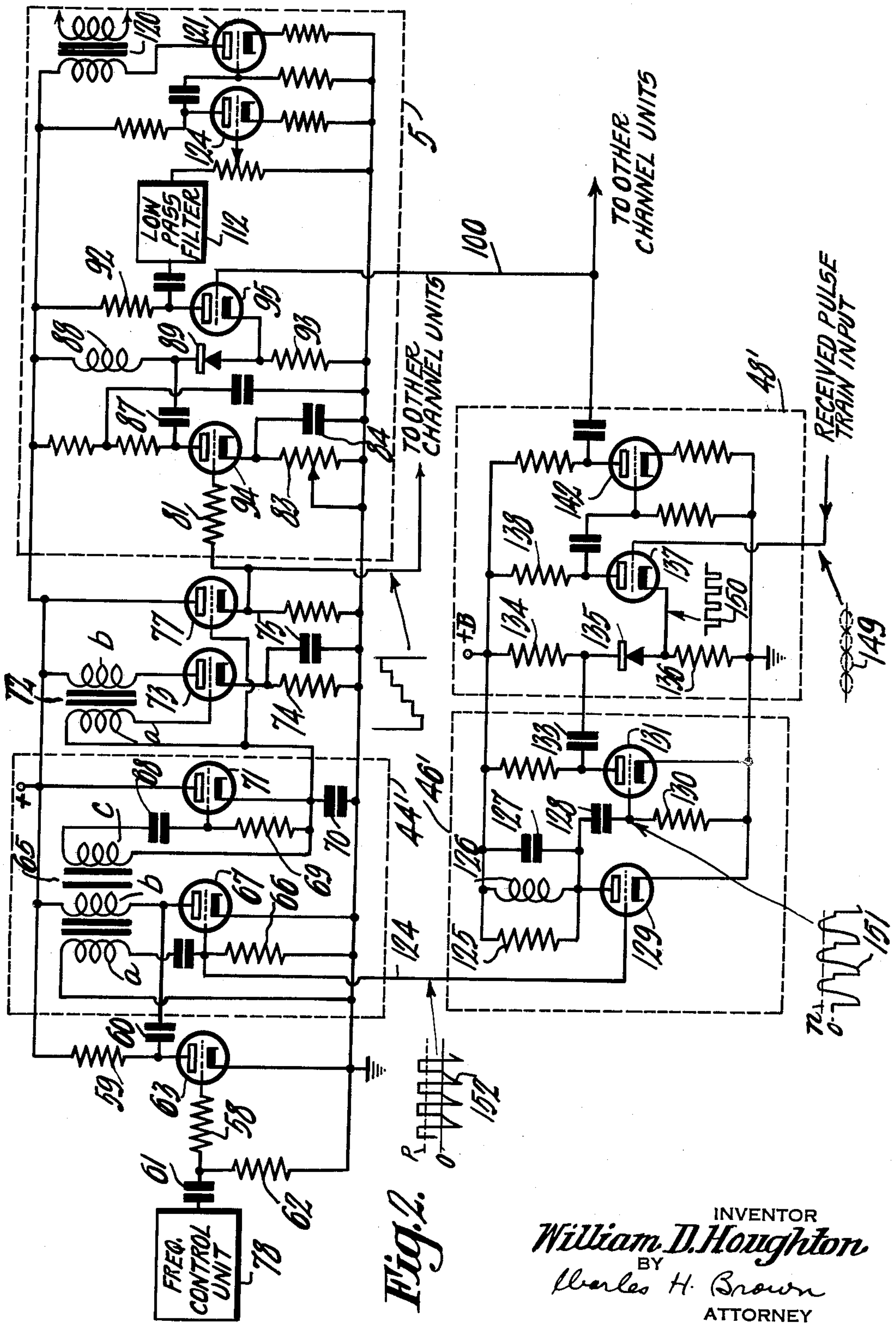

Referring now to Fig. 2, there is shown a portion of receiving terminal incorporating the invention. The normally non-conducting vacuum tube 67 and its associated components, the pulse transformer 65, a grid blocking condenser 64, and the grid leak 66 form a pulse generator which is used to drive a step voltage wave generator consisting of a storage condenser 70, the charge vacuum tube 71, a grid coupling condenser 68, a grid leak 69, a feedback type blocking transformer 72, the discharge vacuum tube 73, a cathode resistor 74, and a cathode by-pass condenser 75.

The pulse generator produces a series of pulses as shown in Fig. 3*a* across winding 65*c* of the pulse transformer 65. The pulse generator is a conventional blocking type oscillator which operates as follows: The vacuum tube 67 is normally non-conducting due to grid leak bias developed across the grid leak resistor 66 due to a charge stored in the condenser 64 leaking off therethrough. As the charge stored in condenser 64 leaks off, the voltage developed across resistor 66 gradually decreases in amplitude until anode current starts to flow in the tube 67. The windings of the transformer 65 are so poled that an increase in anode current results in an increase in grid voltage which further increases the anode current. This action continues until the grid of tube 67 is driven positive, at which time electron current flows into condenser 64 and restores the charge therein. At this time the anode current in the tube 67 ceases to increase and the voltage developed at the grid of tube 67 starts to decrease with a resulting decrease in anode current which further decreases the grid voltage. This action continues until tube 67 is again cut off.

A locking signal voltage, with a frequency slightly higher than the free running frequency of the pulse generator, is coupled to the grid of a normally non-conducting grid leak biased injector tube 63. The positive portion of the voltage, applied to the grid of tube 63 is made sufficient in amplitude to cause grid current to flow in tube 63 and thereby store a charge in the coupling condenser 61. During the time interval between the positive peaks of the voltage applied to the grid of tube 63 the charge stored in condenser 61 starts to leak off through resistor 62 developing a voltage thereacross sufficient to render tube 63 cut off. The time constant of condenser 61 and resistor 62 is made of a value such that there is little change in the voltage developed across resistor 62 during the time interval between successive positive peaks in the voltage applied to the grid of 63. A series grid resistor 58 in the grid circuit of tube 63 is used to limit the maximum positive grid to cathode voltage of 63 to zero. That is, as the grid voltage tries to increase above zero, grid current flows and develops a voltage across resistor 58 sufficient to maintain the grid-to-cathode voltage of 63 at approximately zero. Thus tube 63 is rapidly driven from below cutoff to the zero grid-to-cathode voltage condition upon the application of each positive peak of the voltage produced by the control unit 78. The result is that the anode voltage of tube 63 suddenly drops from a value equal to +B to a low value when tube 63 becomes conducting. The negative going edge of the voltage wave developed across 59 is differentiated by condenser 60 and a negative voltage pulse is applied to the anode winding 65*b* of pulse transformer 65, resulting in a positive voltage pulse being applied to the grid of tube 67. The positive voltage pulse applied to the grid of tube 67 is made of sufficient amplitude to cause anode current to flow in tube 67 just prior to its normal conducting time. The result is that the pulse generator is locked in with the frequency control unit, 78.

The short pulses (short compared to the time interval between pulses as shown in Fig. 3*a*) produced by the pulse generator are applied between the grid and cathode of a normally non-conducting, grid leak biased tube 71. That is, each pulse applied to the grid of tube 71 is sufficient in amplitude to cause grid current to flow and thereby store an electron charge in condenser 68. During the time interval between successive pulses, the charge stored in 68 starts to leak off through resistor 69, developing a voltage thereacross sufficient to render tube 71 non-conducting. The time constant of condenser 68 and resistance 69 is made of a value such that there is little change in voltage across resistor 69 during the time interval between successive pulses.

Each time tube 71 conducts, an electron charge is stored in condenser 70. Since there is no direct current impedance across condenser 70, the charge stored therein remains until the occurrence of the next succeeding pulse on the grid of tube 71, at which time an additional charge is stored in condenser 70.

The successive charges are added one to the other, resulting in a series of steps in voltage being developed across condenser 70, as shown in wave form in Fig. 3*b*. The voltage wave developed across condenser 70 is coupled to the grid of a normally non-conducting tube 73 through a winding 72*a* of the pulse transformer 72. When the voltage applied to the grid of tube 73 exceeds the cutoff biasing potential, electron current starts to flow through the anode winding 72*b* of the transformer 72. The windings of transformer 72 are so poled that an increase in anode current results in an increase in grid voltage. That is, the grid end of winding 72*a* becomes positive with respect to the end of the winding connected to condenser 70. The increase in grid voltage results in an increase in anode current which, in turn, results in a still further increase in grid voltage. This action continues until the grid of tube 73 is made positive with respect to its cathode, at which time grid current flows in the grid circuit of tube 73 resulting in the discharge of condenser 70. At this time the voltage on the grid of tube 73 starts to decrease, resulting in a decrease in anode current which further decreases the grid voltage. This action continues until tube 73 is again cut off. The next following pulse appearing on the grid of tube 71 starts a new step wave or commutating cycle.

The step voltage wave thus developed across condenser 70 is coupled to the utilization circuits by means of a cathode output amplifier 77 which offers a high impedance across condenser 70 and a low impedance to the output or utilization circuits.

Tube 73 is made normally non-conducting due to cathode bias developed across the by-passed cathode resistor 74. That is, each time tube 73 conducts, a charge is stored in condenser 75. During the time interval between successive conducting times of tube 73, the charge stored in condenser 75 starts to leak off through resistor 74, developing a bias voltage thereacross sufficient to render tube 73 non-conducting. The time constant of resistor 74 and condenser 75 is made such that there is little change in the voltage developed across condenser 70 for the time interval during which tube 73 is inoperative. The horizontal dashed line *n* passing through the wave form of Fig. 3*b* indicates the potential above which tube 73 becomes conducting. The reference letters on the individual step voltage risers indicate the manner in which the channels A through D may be made operative.

The step voltage wave thus developed may be used to provide commutating facilities for a number of channel units one of which, that for channel C, is shown, by way of example, within the dotted box 5. The step voltage wave is coupled to the grid of a normally non-conducting selector vacuum tube 94 through a grid current limiting resistor 81. The tube 94 is biased to become conducting on a particular riser in the applied step voltage wave by means of a direct current voltage developed across the potentiometer 83 which is by-passed by condenser 84. That is, each time the tube 94 conducts, an electron charge is stored in the condenser 84 and in the time interval during which tube 94 is non-conducting, the charge stored in condenser 84 starts to leak off through the cathode potentiometer 83 developing a bias thereacross sufficient to maintain tube 94 cut off. The time constant of potentiometer 83 and condenser 84 is made of a value such that there is little change in the voltage developed across the potentiometer 83 for the time interval during which the tube 94 is non-conducting. It should be understood that the selector tubes in the different channel units are differently biased to become conducting on different risers of the applied step voltage wave.

The voltage amplitude of the riser upon which tube 94 is biased to become operative is sufficient to drive the grid of tube 94 from below cut off to a zero grid-to-cathode potential condition. As the amplitude of the applied step wave signal increases above the value at which the zero grid-to-cathode potential condition is reached, there is no appreciable increase in anode current in tube 94, since the grid limiting resistor 81 maintains the grid to cathode potential at zero. The result is that a voltage wave, as shown in Fig. 3*c* is developed at the anode of tube 94. That is, the anode potential remains at a value equal to E1 until tube 94 starts to conduct, at which time it suddenly drops to a low value and remains at this low value for the succeeding voltage increases in the step wave cycle. The dotted line *x* in Fig. 3*b* indicates the cut off voltage on the grid of tube 94 and the dotted line *y* indicates the voltage at which the zero grid-to-cathode potential is reached, when the tube is biased to become operative on the Number 3 step riser. The diode 89 is so poled that electron current, which normally flows through resistor 93, diode 89, and inductance 88 produces a voltage across resistor 93 sufficient to maintain the pulse gate vacuum tube 95 cut off for all levels of input signal. Condenser 87 and coil 88 form a series tuned circuit coupled to the anode circuit of tube 94 and the cathode of tube 95. When the anode current in tube 94 suddenly increases, the tuned circuit starts to oscillate and swings negative, due to electron current flowing into condenser 87, causing the anode potential of diode 89 to be reduced to a value lower than its cathode. Diode 89 then ceases conducting, with the result that the cut off bias is removed from the pulse gate tube 95, and the tube operates as a normal class A amplifier for a short time interval. When the voltage developed across condenser 87 and inductance 88 swings positive, diode 89 again conducts and causes tube 95 to cut off, while at the same time damping is impressed across the tuned circuit, dissipating the energy stored therein. Due to the current drawn by tube 95 a negative pulse is developed across the anode resistor 92 which is common to all transmitting channels coupled to the step voltage wave commutator. The amplitude of the pulse developed across resistor 92 is a function of the signal applied to the grid of tube 95 and the duration of the pulse is a function of the conducting time of tube 95, which in turn is a function of the cut off time of diode 89. Fig. 3*d* shows the half cycle of oscillation developed at the anode of diode 89. The horizontal dotted line *z* indicates the potential below which tube 94 becomes operative. Fig. 3*e* shows the negative gating pulses developed across resistor 93.

The pulse passed by tube 95 is coupled to a low pass filter 112 which offers high attenuation for the pulse frequency components and low attenuation for the message wave signal components. The resulting message wave signal is applied to the grid of a voltage amplifier vacuum tube 124. Tube 124 amplifies the signal and couples it to the grid of vacuum tube 121. Tube 121 is a power amplifier which couples the message to a suitable output by means of an output transformer 120.

While so much of the apparatus so far described has been applied to a receiving terminal equipment, it will be clear that it is also suitable for use at the transmitting end. Thus, similar step voltage wave forms would be generated and used in a similar manner to control the pulse gate tube 95. The type of information passed by the gating tube 95 would be dependent upon the signal applied to its grid via lead 100. In the arrangement shown in Fig. 2 it is being fed with the pulse train signal. In a transmitter arrangement, it would be fed with the message wave. In the latter instance, the output of the gating tube 95 would be pulses representative of the message wave and, instead of being coupled to the amplifying tubes 124 and 121 through the low pass filter 112, would be combined in time sequence with the pulse outputs of similar channel units to form the pulse train signal.

It is also possible to utilize the above described portion of the apparatus to provide a number of step voltage waves interlaced in time to produce commutating facilities for a larger number of channels than is practical with the single step voltage wave commutator previously described. One manner of incorporating this arrangement into a transmitting terminal is shown in Fig. 4.

Figure 4:
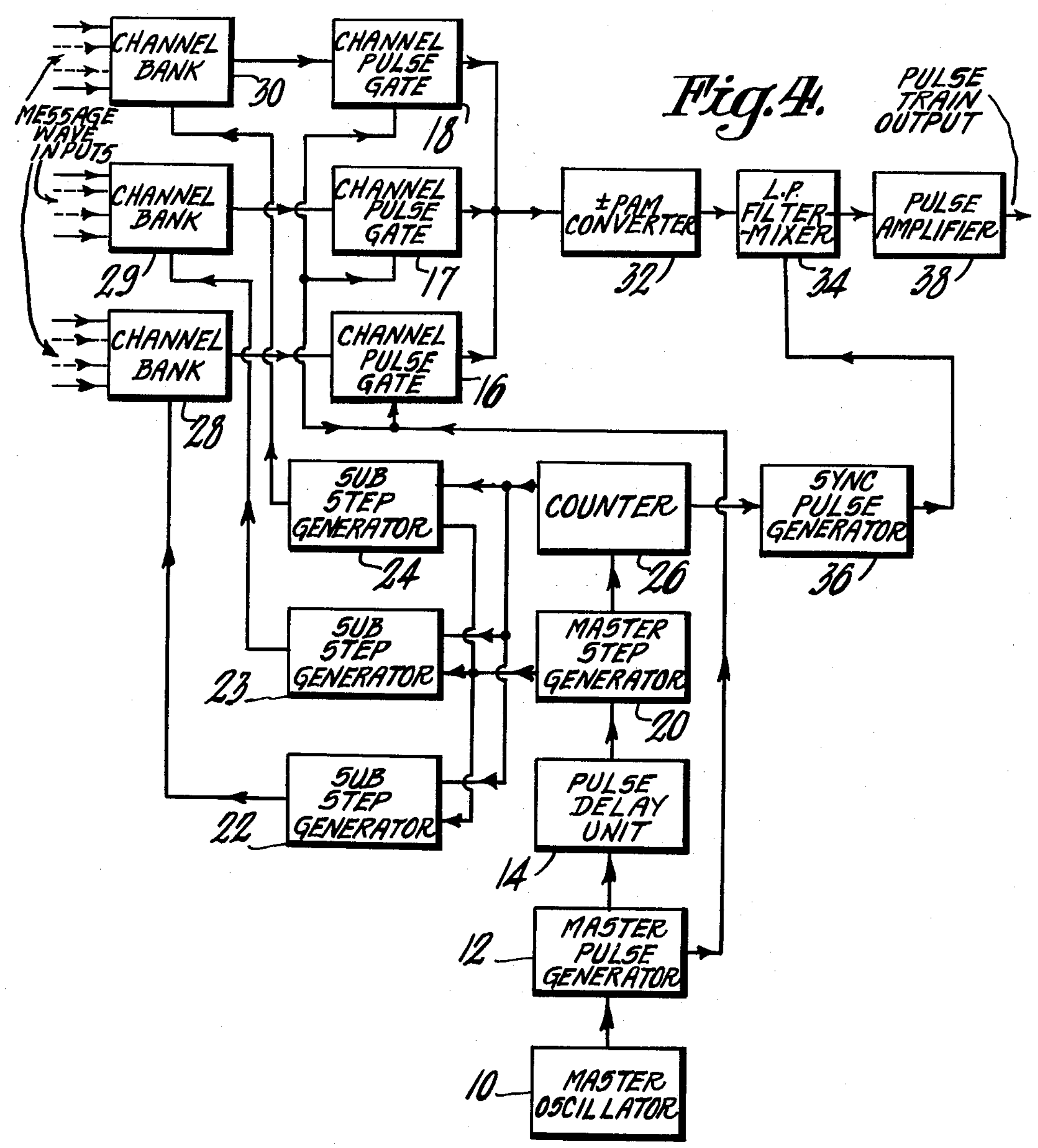

Referring to Fig. 4, the basic timing circuit is a master oscillator 10 which locks in a master pulse generator 12. The pulses from the pulse generator 12 are coupled to a delay unit 14 and to three channel pulse gates 16, 17 and 18. The delayed pulses from the delay unit 15 are coupled to a master step voltage wave generator 20, which in turn drives three sub step generators 22, 23 and 24 and a counter circuit 26. The counter circuit 26 produces pulses which are used to simultaneously discharge the three sub step wave generators 23, 24 and 25. Each of the three sub step generators drives a bank of channel units 28, 29 and 30 respectively. The output pulses from the channel banks 28, 29 and 30 are coupled to the channel pulse gates 16, 17 and 18 as shown. Each of the channel pulse gates sample the center of the channel pulses as was described for the four-channel system indicated in Fig. 1. The output pulse from the channel pulse gates 16, 17 and 18 are combined in time sequence and are coupled to the ±P. A. M. converter unit 32. The plus and minus output from the ±P. A. M. converter 32 is fed to a low pass filter and mixer unit 34 where they are combined with the synchronizing pulses from the synchronizing pulse generator 36. The synchronizing pulse generator 36 is driven from the counter 26 as shown. The resulting pulse train signal is amplified by an amplifier 38 and supplied to the transmission medium. For a more detailed description of a comparable system reference may be had to my copending application Serial No. 786,286 filed November 15, 1947, now U. S. Patent No. 2,543,738 issued February 27, 1951. However, it is believed that a consideration of the curves illustrated in Figs. 5*a* through 5*l* will clarify the operation of such a transmitting system.

Figures 5A, 5B, 5C, 5D, 5E, 5F, 5G, 5H, 5I, 5J, 5K, 5L:
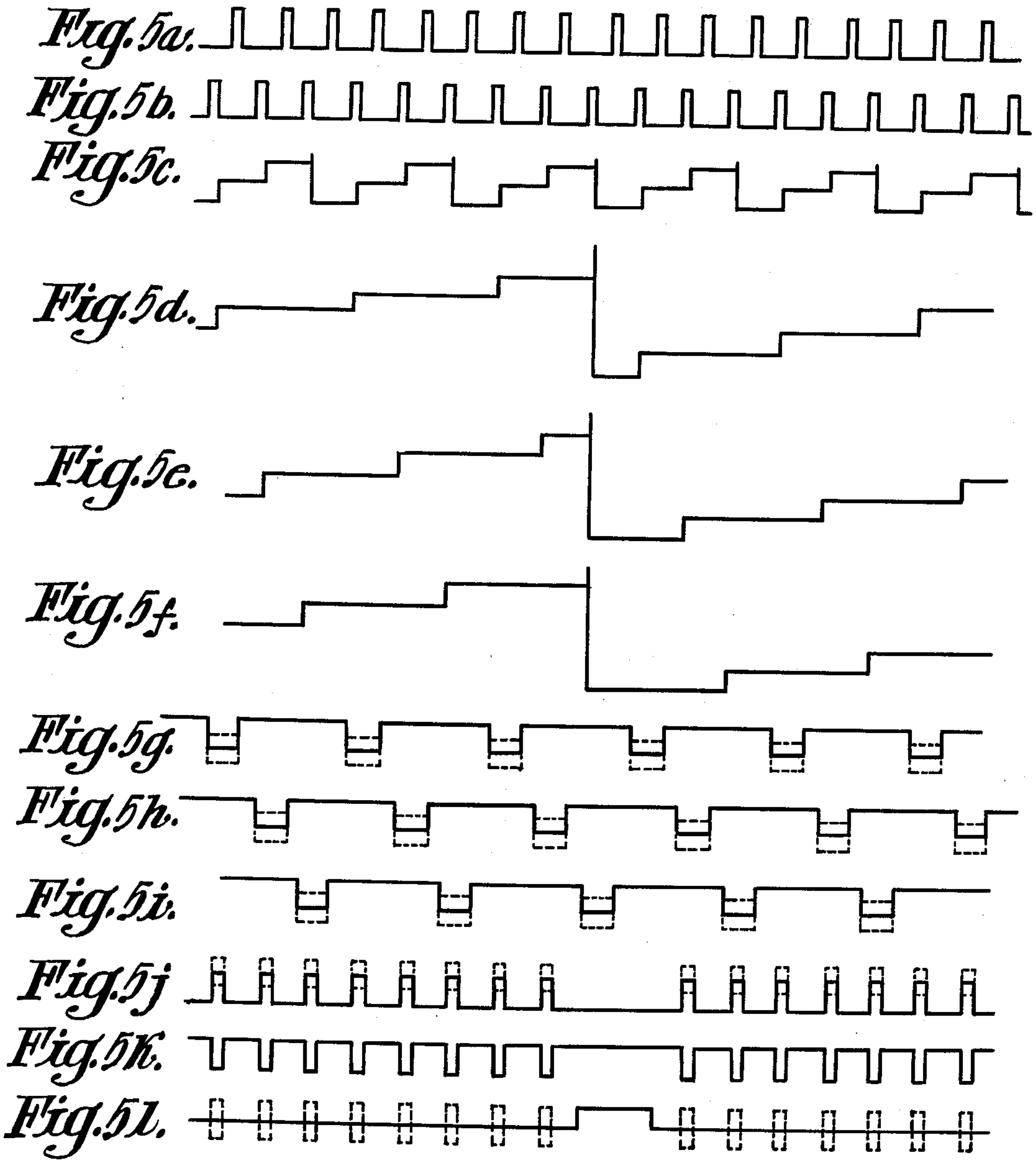

Fig. 5*a* represents a pulse signal such as produced by the pulse generator 12 shown in Fig. 4. The pulses are delayed by means of the delay network 14 and appear as shown in Fig. 5*b*. It will be noted that the pulses in Fig. 5*b* occupy a later time position than the pulses of Fig. 5*a*. The delayed pulses of Fig. 5*b* are coupled to the master step wave generator 20 which produces a step voltage wave as shown in Fig. 5*c*. For purposes of simplicity, only three steps are shown. It is to be understood that more or fewer steps can be used depending upon the requirements of the system. The master step generator output is coupled to the sub step generators 22, 23 and 24 which produce step voltage waves as shown in Figs. 5*d* through 5*f*. From an inspection of Figs. 5*c* through 5*f* it will be seen that the risers of each of the sub step generators occur in synchronization of a particular riser of master step wave. That is, the risers of the sub step voltage wave of Fig. 5*d* occur at the first riser of each frame of the master step wave voltage of Fig. 5*c*. Similarly the risers of the step voltage wave of Fig. 5*e* occur at the second riser of each frame of the master step voltage wave of Fig. 5*c*. A similar timing occurs for the other step wave voltage of Fig. 5*f*. As a result the time of occurrence of the risers of the sub step voltages are interleaved and occur midway between the occurrence time of the risers of the step voltage waves occupying adjacent time intervals.

The pulse signals shown in Figs. 5*g*, 5*h* and 5*i* indicate the amplitude modulated pulses produced by the channel banks 28, 29 and 30 operating on the sub step waves of Figs. 5*d*, 5*e* and 5*f* respectively.

The channel pulse gates 16, 17 and 18, operating under the control of pulse from the pulse generator 12 and with a timing as indicated in Fig. 5*a*, sample the center portion of each of the pulses from their respective channel banks. The resulting pulse train fed to the ±P. A. M. converter 32 is indicated in Fig. 5*j*.

In the ±P. A. M. converter 32 the pulse train output from the channel gates are combined with pulses as indicated in Fig. 5*k* which remove the direct current component as described above and passed to the mixer 34 where the synchronizing signal is added resulting in a pulse train signal as indicated in Fig. 5*l*.

Figure 6:
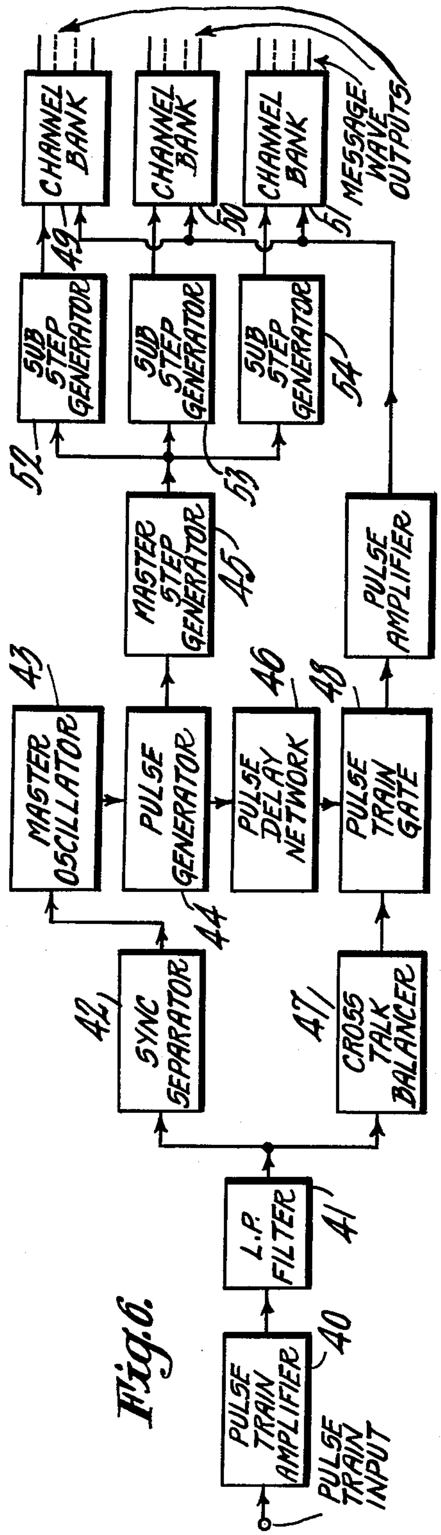
Fig. 6 is a representation in block diagram of a receiver embodying the principles of the invention.

One manner of utilizing the principles of the invention at the receiving terminal is shown by way of example in Fig. 6. There the pulse train signal is fed to an amplifier 40 and thence to a low pass filter 41. The signal is fed to the synchronizing signal separator 42 which extracts the synchronizing signal and passes it to the receiver master oscillator 43. The oscillator 43 controls a pulse generator 44 which supplies pulses to the master step wave generator 45 and to a pulse delay network 46. The pulse signal train from the filter 41 is also fed to a cross talk balancing unit 47 preferably of the type shown in my copending application, Serial No. 208,063 filed January 26, 1951. The output from the balancer 47 is fed to the pulse train gate 48 where the pulse train signal is sampled to produce a pulse train signal in which the pulses are amplitude modulated in accordance with signal intelligence and which have a time duration which is short compared with the time interval between pulses as described in connection with the curves of Fig. 1. The latter pulse train signal is passed to banks of channel units 49, 50 and 51 where the channel pulses are selected and reformed into the original message waves. The channel banks 49, 50 and 51 are operated under the control of sub step generators 52, 53 and 54 which in turn operate under the control of the master step generator 45.

Referring back to Fig. 2, the manner in which the control pulses are delayed and the input pulse signal train is sampled will be described. It will be noted that the pulse generator 44 of Fig. 6 corresponds to the equipment within the dotted box 44′, the pulse delay network 46 to the equipment within the dotted box 46′ and the pulse gate 48 to the equipment within the dotted box 48′.

The short pulses, as shown in wave form 152, produced across winding 65*a* of pulse transformer 65, are coupled to the grid of a normally non-conducting, grid leak biased tube 129 via lead 124. The horizontal dotted line P indicates the potential above which tube 129 becomes conducting. The anode of tube 129 is coupled to a damped tuned circuit consisting of a coil 126, condenser 127, and resistor 125. Each time tube 129 conducts, a pulse of anode current flows into the tuned circuit and starts a cycle of oscillation as shown in wave form 151. The damped oscillation developed across this circuit is coupled to the grid of a normally non-conducting, grid leak biased tube 131 as shown. Grid leak bias is developed across resistor 130 due to a charge stored in condenser 128 on the positive portion of each pulse applied to the grid of tube 131. The horizontal dashed line *n* through wave form 151 indicates the potential above which tube 131 becomes operative. The tuning of inductance 126 and condenser 127 is adjusted in a manner such that tube 131 becomes operative at a predetermined time interval following the operative time of tube 129. As a result, a series of negative pulses as shown in wave form 150 are developed at the anode of tube 131 and are coupled to the anode of a normally conducting diode 135 by means of a blocking condenser 133. The diode 135 is so poled that normally electron current flows through resistor 134, diode 135, and resistor 136, developing a voltage across resistor 136 sufficient to render tube 137 inoperative. The negative pulses applied to the anode of diode 135 causes it to cut off, resulting in the cut off bias being removed from tube 137. Therefore tube 137 operates as a class A amplifier for the duration of the pulse applied to the anode of 135 and is cut off for all other times.

The received pulse train as shown in wave form 149 is coupled to the grid of tube 137 as shown.

When the repetition rate and timing of the pulses applied to the anode of diode 135 is made equal to the repetition rate and timing of the received channel pulses, then when tube 137 becomes operative, it samples the center of the received channel pulses, resulting in a pulse signal being developed across the anode resistor 138. The pulse train developed at the anode of 137 is inverted and coupled to a pulse output connection via a normally conducting pulse amplifier tube 142.

By means of the circuit of Fig. 2, relatively long and slightly overlapping pulses may be sampled, thereby producing a pulse signal consisting of shorter, non-overlapping pulses each bearing modulation which varies in accordance with the modulation applied to the different pulses sampled.

Figure 7:
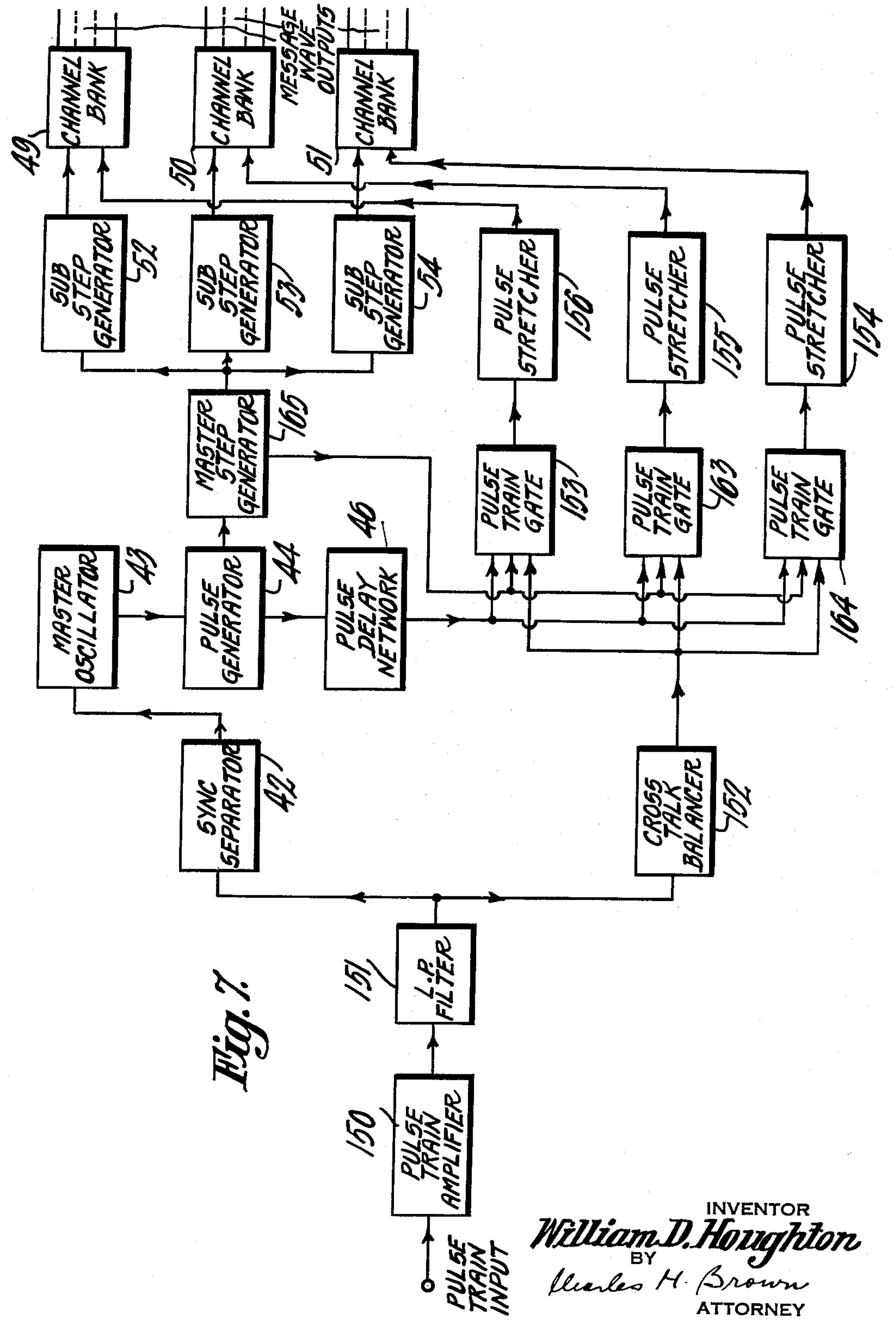
Fig. 7 is a representation in block diagram of another receiver arrangement embodying the principles of the invention; and, Figs. 8*a* through 8*g* are a series of curves illustrating the operation of the arrangement shown in Fig. 7.

By utilizing the principles of the invention with pulse stretching circuits it is possible to widen or increase the duration of the selected channel pulses, thereby providing a considerable increase in the signal pulse energy applied to the channel units. A receiving circuit employing these principles is shown by way of example in Fig. 7. The operation of this arrangement will become apparent upon a consideration of Figs. 7 and 8.

A received pulse train signal is coupled to a low pass filter 151 via a pulse amplifier 150. The pulse train from the low pass filter is coupled to a crosstalk balancer 152. The pulses from balancer 152, as shown in the wave form Fig. 8*a*, are coupled to three pulse gate or sampling circuits 153, 163 and 164 as shown.

Figures 8A, 8B, 8C, 8D, 8E, 8F, 8G:
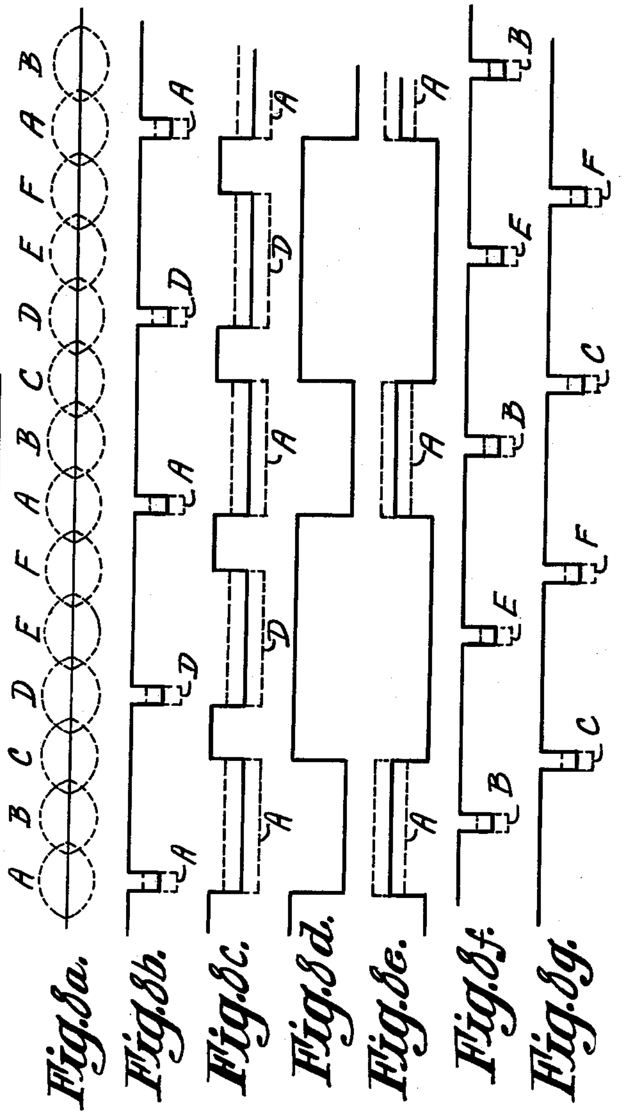

The three gate circuits, 153, 163 and 164 are driven from the master step generator 165 in a manner such that each gate selects every third pulse, as shown in the wave forms of Figs. 8*b*, 8*f* and 8*g*.

The pulses selected by the channel pulse gate circuits 153, 163 and 164 are coupled to three pulse stretcher networks 154, 155 and 156 respectively.

The operation of one channel pulse gate and one pulse stretcher is as shown in Figs. 8*b*, 8*c*, 8*d* and 8*e*. The channel pulse gate circuits of Fig. 8*b* is set to sample every 3rd pulse from the pulse train, as shown at A and D. The selected pulses are then increased in duration as shown in Fig. 8*c* without changing the character of the amplitude modulation contained thereon. Such an increase in pulse duration is permissible since the time interval between adjacent pulses has been increased due to the removal of pulses B and C.

The pulses as shown in Fig. 8*c* are coupled to a group of receiving channel banks 49, 50 and 51. The channel units then select predetermined pulses and couple the demodulated signal to a suitable output connection. Fig. 8*d* represents a gate pulse set to select the pulse for channel A and Fig. 8*e* represents the selected channel pulse A. By similar reasoning, the pulses of Figs. 8*f* and 8*g* may be increased in duration and selected by similar receiving channel units.

From the foregoing description of the invention it will be seen that a considerable reduction in cost of construction, the complexity of adjustment, and the cost of operation may be realized when the invention is employed in time division multiplex systems involving a large number of intelligence carrying channels.

What I claim is:

1. In a time division multiplex system a pulse generator, a plurality of gating circuits operated under the control of pulses from said pulse generator, means for producing control pulses of shorter duration than the duration of the pulses from said pulse generator, said control pulses occurring during the time interval occupied by said generated pulses, means for routing pulse train signals over a path to said gating circuits, a pulse train gating circuit in said path, means applying said control pulses to said pulse train gating circuit whereby said pulse train gating circuit is opened at the occurrence of the leading edges of said control pulses and closed at the occurrence of the trailing edges of said control pulses, and means sequentially opening said plurality of gating circuits at the occurrence of the leading edge of said generated pulses and closing said plurality of gating circuits at the occurrence of the trailing edge of the generated pulse, which effected its opening whereby each of said plurality of gating circuits is opened and closed during no-signal time intervals and passes only selected pulses from said pulse train gating circuit.

2. In a time division multiplex system a pulse generator, a plurality of gating circuits operated under the control of pulses from said pulse generator, means for producing control pulses of shorter duration than the duration of the pulses from said pulse generator, said control pulses occurring during the time interval occupied by said generated pulses, means for routing pulse train signals over a plurality of paths to said gating circuits, a pulse train gating circuit in each of said paths, means applying said control pulses to each of said pulse train gating circuits whereby they are opened in time sequence at the occurrence of the leading edges of said control pulses and closed at the occurrence of the trailing edges of said control pulses, means in each of said paths between said pulse train gating circuits and said plurality of circuits increasing the duration of the pulses passed by said pulse train gating circuits, and means sequentially opening said plurality of gating circuits at the occurrence of the leading edges of said generated pulses and closing said plurality of gating circuits at the occurrence of the trailing edge of the generated pulse which effected its opening, whereby each of said plurality of gating circuits is opened and closed during no-signal time intervals and passes only selected pulses from said pulse duration increasing means.

3. In a time division multiplex system, a plurality of gating circuits adapted to be opened and closed at controlled intervals, means for sampling a pulse train signal to produce a new pulse train signal having spaced pulses of shorter duration than the open time of any one of said gating circuits, means feeding said new pulse train to said gating circuits, and means for opening and closing said gating circuits, sequentially during no-signal time intervals.

4. A time division multiplex system including a plurality of individual signal channels, a common signal path for translating a pulse signal train, commutator means successively interconnecting said individual signal channels to said common signal path for a given time duration, and a gate circuit interposed in said common signal path, said gate circuit comprising an electron discharge system having at least cathode and grid electrodes, said pulse signal train being applied to said grid electrode, and means to lower the potential on said cathode electrode periodically for periods of time duration shorter than said given time duration, thereby to produce a further pulse signal train substantially free from adjacent channel interference or cross talk.

5. A time division multiplex transmitter comprising, a plurality of individual signal sources, a common signal path, a plurality of individual gating circuits each having an input coupled to a respective one of said signal sources and having an output coupled to said common signal path, a pulse oscillator, individual gate wave generating means operating under control of said oscillator and having outputs coupled to said individual gating circuits to successively open said gating circuits for a given time duration to produce a pulse train wave in said common signal path, a common gating circuit in said common signal path, and common gate wave generating means operating under control of said oscillator and having an output coupled to said common gating circuit to open the common gating circuit during the occurrence of each pulse therein and for a time duration less than said given time duration, whereby adjacent channel interference or cross talk is reduced.

6. A time division pulse multiplex transmitter as defined in claim 5 wherein said individual gate wave generating means comprises a step wave commutating system, and wherein said common gate wave generating means provides a pulse wave having the same repetition rate as said pulse oscillator.

References Cited in the file of this patent

UNITED STATES PATENTS 2,326,584 Van Zelst ---------- Aug. 10, 1943

2,498,678 Grieg ---------- Feb. 28, 1950